United States Patent
Murakami et al.

(10) Patent No.: US 10,103,973 B2
(45) Date of Patent: Oct. 16, 2018

(54) COMMUNICATION DEVICE AND MULTI-HOP NETWORK

(71) Applicant: KABUSHIKI KAISHA TOSHIBA, Tokyo (JP)

(72) Inventors: Takaomi Murakami, Kanagawa (JP); Yoshihiro Oba, Kanagawa (JP); Ren Sakata, Kanagawa (JP); Hiroki Kudo, Kanagawa (JP); Jumpei Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 14/751,473

(22) Filed: Jun. 26, 2015

(65) Prior Publication Data
US 2015/0381473 A1    Dec. 31, 2015

(30) Foreign Application Priority Data
Jun. 30, 2014  (JP) ................. 2014-135039

(51) Int. Cl.
*H04L 12/707* (2013.01)

(52) U.S. Cl.
CPC ............. *H04L 45/22* (2013.01); *H04L 45/24* (2013.01)

(58) Field of Classification Search
CPC ............................. H04L 45/22; H04L 45/24
USPC ....................................................... 370/351
See application file for complete search history.

(56) References Cited

U.S. PATENT DOCUMENTS

| | | | |
|---|---|---|---|
| 7,848,309 B2* | 12/2010 | Matsukura | H04B 7/155 370/351 |
| 8,774,051 B2 | 7/2014 | Yamamoto et al. | |
| 9,730,140 B2 | 8/2017 | Yamada et al. | |
| 2007/0091811 A1* | 4/2007 | Thubert | H04L 43/022 370/238 |
| 2008/0095058 A1* | 4/2008 | Dalmases | H04L 45/00 370/237 |

(Continued)

FOREIGN PATENT DOCUMENTS

| | | |
|---|---|---|
| JP | 2007-135136 | 5/2007 |
| JP | 2008-135817 | 6/2008 |

(Continued)

OTHER PUBLICATIONS

Winter et al., "RPL: IPv6 Routing Protocol for Low-Power and Lossy Networks," IETF, RFC6550, 2012, pp. 1-157.

(Continued)

*Primary Examiner* — Edan Orgad
*Assistant Examiner* — Saumit Shah
(74) *Attorney, Agent, or Firm* — Nixon & Vanderhye, P.C.

(57) ABSTRACT

A communication device according to an embodiment is included in a multi-hop network. The communication device includes a holder, a storage, a switcher, and a controller. The holder holds communication data. The storage stores path information including an identifier that identifies a communication path and destination information that indicates a destination of communication data on the communication path. The switcher switches a communication path used to transmit communication data on the basis of the path information stored in the storage. The controller transmits communication data to a destination of a communication path switched by the switcher.

5 Claims, 13 Drawing Sheets

(56) References Cited

U.S. PATENT DOCUMENTS

| | | | | |
|---|---|---|---|---|
| 2012/0147895 A1* | 6/2012 | Choudhury | ............ | H04L 45/125 370/401 |
| 2013/0223218 A1* | 8/2013 | Vasseur | .................. | H04L 45/34 370/232 |
| 2014/0029445 A1* | 1/2014 | Hui | ......................... | H04L 45/34 370/248 |
| 2014/0177626 A1* | 6/2014 | Thottethodi | ........ | G06F 17/5068 370/351 |
| 2014/0369185 A1* | 12/2014 | Chen | ...................... | H04L 45/50 370/221 |

FOREIGN PATENT DOCUMENTS

| | | |
|---|---|---|
| JP | 2012-095023 | 5/2012 |
| JP | 2013-214834 | 10/2013 |
| WO | 2013/088498 | 6/2013 |

OTHER PUBLICATIONS

English-language machine translation of JP2007-135136.
English-language machine translation of JP2013-214834.

\* cited by examiner

| COMMUNICATION PATH ID | NEXT HOP | COMMUNICATION INTERFACE | PRIORITY |
|---|---|---|---|
| 01 | COMMUNICATION DEVICE 11 | WIRELESS | 1 |
| 02 | COMMUNICATION DEVICE 12 | WIRED | 0 |

FIG. 3

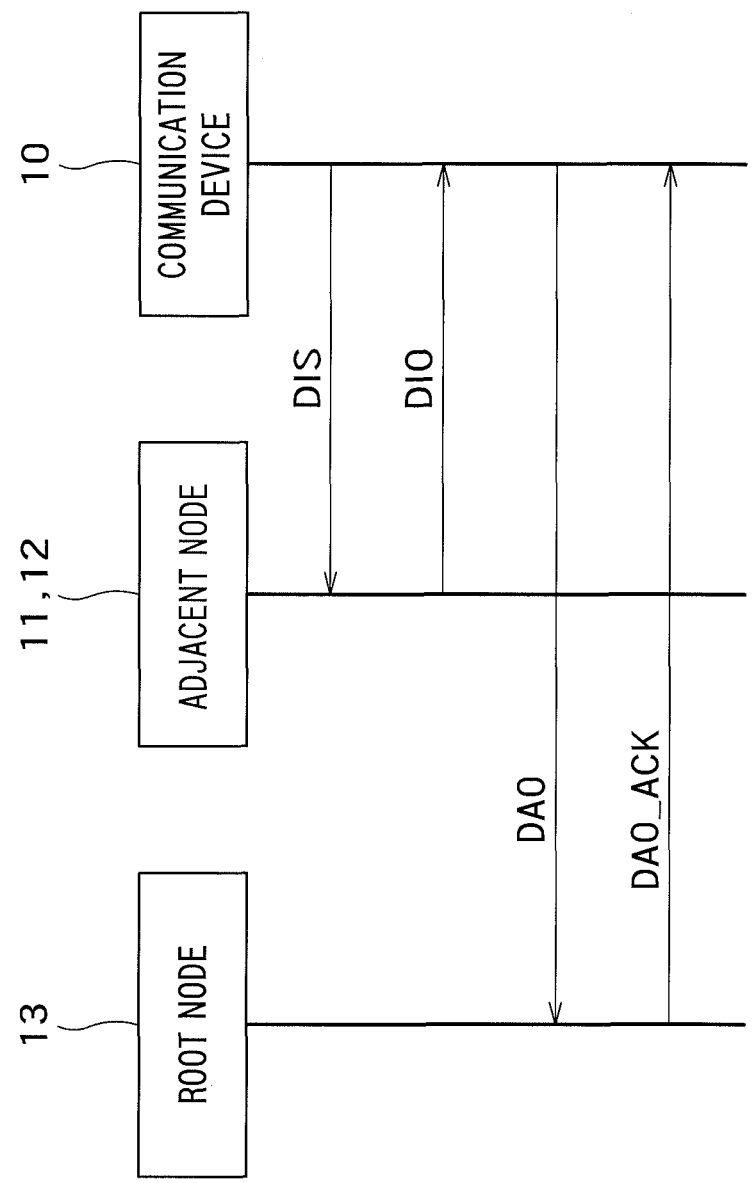

| 0 | 7 | 8 | 15 | 16 | 23 | 24 | 31 |
|---|---|---|---|---|---|---|---|
| RPLInstanceID | | Version # | | Rank | | | |
| G/0/MOP/Prf | | DTSN | | Flags | | Reserved | |
| DODAGID | | | | | | | |

| FIELD NAME | LENGTH | DESCRIPTION |
|---|---|---|
| RPLInstanceID | 1Byte | IDENTIFIER OF INSTANCE OF RPL |
| Version number | 1Byte | VERSION NUMBER |
| Rank | 2Byte | RANK VALUE OF WIRELESS COMMUNICATION DEVICE |
| G | 1bit | CONNECTIVITY WITH SERVER DEVICE |
| MOP | 3bit | OPERATION MODE |
| Prf | 3bit | PRIORITY OF PATH |
| DTSN | 1Byte | |
| Flags | 1Byte | FLAGS |
| DODAGID | 16Byte | IPv6 ADDRESS OF SERVER DEVICE |

FIG. 12

| DODAG INFORMATION | ADJUCENT DEVICE LIST | |
|---|---|---|
| DODAG 1 | DEVICE ADDRESS | RANK VALUE |
| RPLInstanceID=1 | "2001::1" | 0 |
| DODAGID= "2001::1" | "2001::2" | 256 |
| Version #=8 | "2001::10" | 512 |
| SELF RANK VALUE=256 | | |
| ADJUCENT DEVICE LIST | | |

FIG. 14

| DODAG INFORMTION | ADJUCENT DEVICE LIST | |
|---|---|---|
| DODAG 2 | DEVICE ADDRESS | RANK VALUE |
| RPLInstanceID=128 | "2001::1" | 256 |
| DODAGID= "2001::2" | "2001::2" | 0 |
| Version #=4 | | |
| SELF RANK VALUE=256 | | |
| ADJUCENT DEVICE LIST | | |

FIG. 15

COMMUNICATION DEVICE AND MULTI-HOP NETWORK

CROSS REFERENCE TO RELATED APPLICATION(S)

This application is based upon and claims the benefit of priority from the prior Japanese Patent Application No. 2014-135039, filed on Jun. 30, 2014, the entire contents of which are incorporated herein by reference.

FIELD

Embodiments described herein relate generally to a communication device and a multi-hop network.

BACKGROUND

Conventionally, as a forming method of a communication path in a multi-hop network, a method of forming a plurality of communication paths from a communication device to a server (root node) is known. Further, a method is known which maintains communication quality by changing a communication path used to transmit communication data at every predetermined time from among the plurality of communication paths formed by the aforementioned method.

However, in the conventional method described above, although it is possible to change the communication path from the communication device to a predetermined server, when the predetermined server is changed to another server, it is not possible to change the communication path to the predetermined server to a communication path to the other server according to the change of the server.

BRIEF DESCRIPTION OF THE DRAWINGS

FIG. 3 is a table illustrating an example of path information;

FIG. 11 is a sequence diagram illustrating an operation of a communication device according to a fourth embodiment;

FIG. 12 is a diagram illustrating an example of a format of DIO;

FIG. 14 is a diagram illustrating an example of DODAG information; and

FIG. 15 is a diagram illustrating an example of DODAG information.

DETAILED DESCRIPTION

Embodiments will now be explained with reference to the accompanying drawings. The present invention is not limited to the embodiments.

A communication device according to an embodiment is included in a multi-hop network. The communication device includes a holder, a storage, a switcher, and a controller. The holder holds communication data. The storage stores path information including an identifier that identifies a communication path and destination information that indicates a destination of communication data on the communication path. The switcher switches a communication path used to transmit communication data on the basis of the path information stored in the storage. The controller transmits communication data to a destination of a communication path switched by the switcher.

First Embodiment

A communication device 10 according to a first embodiment will be described with reference to FIGS. 1 to 6. The communication device 10 according to the present embodiment is included in a multi-hop network. The multi-hop network is a network which has a tree topology and which includes a plurality of communication devices (nodes). In the multi-hop network, various kinds of information are transmitted between a plurality of communication devices according to a communication path. In the present embodiment, the communication device 10 switches a communication path in use to a new communication path to another root node received from another communication device.

Figure 1:
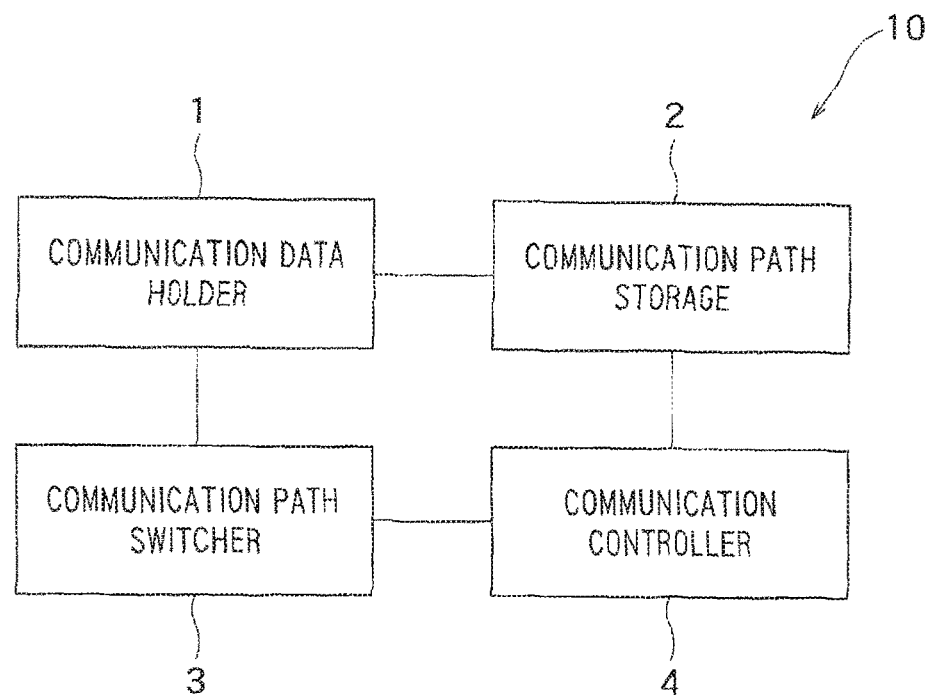
FIG. 1 is a block diagram illustrating a functional configuration of a communication device according to a first embodiment.

First, a functional configuration of the communication device 10 according to the present embodiment will be described with reference to FIGS. 1 to 3. FIG. 1 is a block diagram illustrating the functional configuration of the communication device 10 according to the present embodiment. As illustrated in FIG. 1, the communication device 10 includes a communication data holder 1, a communication path storage 2, a communication path switcher 3, and a communication controller 4.

The communication data holder 1 (hereinafter referred to as "holder 1") holds communication data. The communication data is any data to be transmitted in the multi-hop network. The communication data held by the holder 1 is transmitted from the communication device 10 to another communication device included in the multi-hop network according to a communication path.

The communication path storage 2 (hereinafter referred to as "storage 2") stores path information. The path information is information that is set for each communication path. The path information includes a path identifier, destination information, interface information, and priority information. However, it is not limited to this.

The path identifier is information that identifies each communication path. When an ID is assigned to each communication path, the ID can be used as the path identifier. In the description below, a communication path identified by ID00 (00 is arbitrarily determined) is referred to as a communication path 00.

When there is only one communication path from the communication device 10 to a root node (a communication device of final destination), an address of the root node can be used as the path identifier. Specifically, a server address and a border router address can be used as the path identifier.

Figure 2:
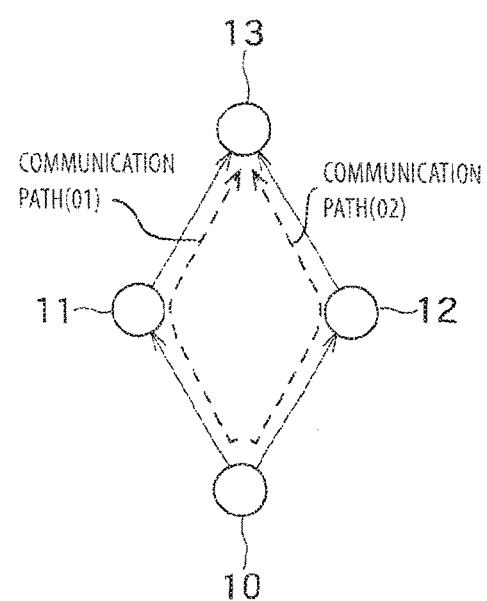
FIG. 2 is a diagram illustrating an example of a multi-hop network.

Here, FIG. 2 is a diagram illustrating an example of the multi-hop network including the communication device 10. The multi-hop network of FIG. 2 includes four communication devices 10 to 13. In FIG. 2, the root node is the communication device 13. There are two communication paths from the communication device 10 to the root node. One is a communication path 01 that goes through the communication device 11 and the other is a communication path 02 that goes through the communication device 12.

As illustrated in FIG. 2, when there are two communication paths from the communication device 10 to the root node, the communication path cannot be identified from only the root node address. In such a case, information that identifies each of a plurality of communication paths to the root node may be used along with the root node address as the path identifier. For example, RPL Instance ID may be used as such information. The RPL Instance ID will be described later.

The destination information is information indicating a destination of communication data which is set for each communication path, that is, the communication device of transmission destination of the communication data. For example, in the case of the communication path 01 in FIG. 2, the destination of the communication device 10 is the communication device 11. In the description below, the "destination" is referred to as "next hop". The destination information is, for example, an address of a communication device of a next hop.

The interface information is information indicating a communication interface that is set for each communication path or for each next hop. An ID and a type assigned to each communication interface included in the communication device 10 can be used as the interface information. When the communication device 10 includes only one communication interface, the storage 2 need not store the interface information.

The priority information is information indicating priority whether or not to use a communication path to transmit communication data. The priority indicated by the priority information may be two-valued priority corresponding to "use" and "non-use" or may be multiple-valued priority. In the description below, the priority 1 corresponds to "use" and the priority 0 corresponds to "non-use". The 1 and 0 may be reversed.

Here, FIG. 3 is a table illustrating an example of the path information stored in the storage 2 of the communication device 10 in FIG. 2. According to the path information of FIG. 3, the communication device 10 uses the communication path 01 and wirelessly transmits communication data to the communication device 11. As illustrated in FIG. 3, the storage 2 may store path information of a plurality of communication paths.

The communication path switcher 3 (hereinafter referred to as "switcher 3") switches a communication path used to transmit the communication data on the basis of the path information stored in the storage 2. In the present embodiment, the switcher 3 receives path information from another communication device, compares the received path information with the path information stored in the storage 2, and selects the communication path to be used. After the switcher 3 selects the communication path to be used, the switcher 3 changes the priority of the selected communication path to 1 and changes the priority of the other communication path stored in the storage 2 to 0. Thereby, the communication path is switched. The selection method of the communication path by the switcher 3 will be described later.

The communication controller 4 (hereinafter, referred to as "controller 4") transmits the communication data by using the communication path switched by the switcher 3. First, the controller 4 refers to the priority information stored in the storage 2 and receives the path information of the priority 1. Next, the controller 4 refers to the destination information of the received path information and receives the next hop. Then, the controller 4 transmits the communication data held by the holder 1 to the received next hop through the communication interface. The communication data transmitted by the communication controller 4 may be communication data received from another communication device or may be communication data generated by the communication device 10.

When the interface information is stored in the storage 2, the controller 4 refers to the interface information and receives the communication interface set as the communication path to be used. The controller 4 transmits the communication data through the received communication interface. Thereby, even when the communication device 10 includes a plurality of communication interfaces, the communication device 10 can selectively use the communication interface according to the communication path.

Next, a hardware configuration of the communication device 10 according to the present embodiment will be described with reference to FIG. 4. The communication device 10 according to the present embodiment is a device which includes a computer and can perform wired or wireless data communication. The communication device 10 is, for example, a server, a router, a sensor, a smartphone, and a smart meter. However, it is not limited to these. In any case, the communication device 10 realizes functional components described above by executing a program by a computer.

Figure 4:
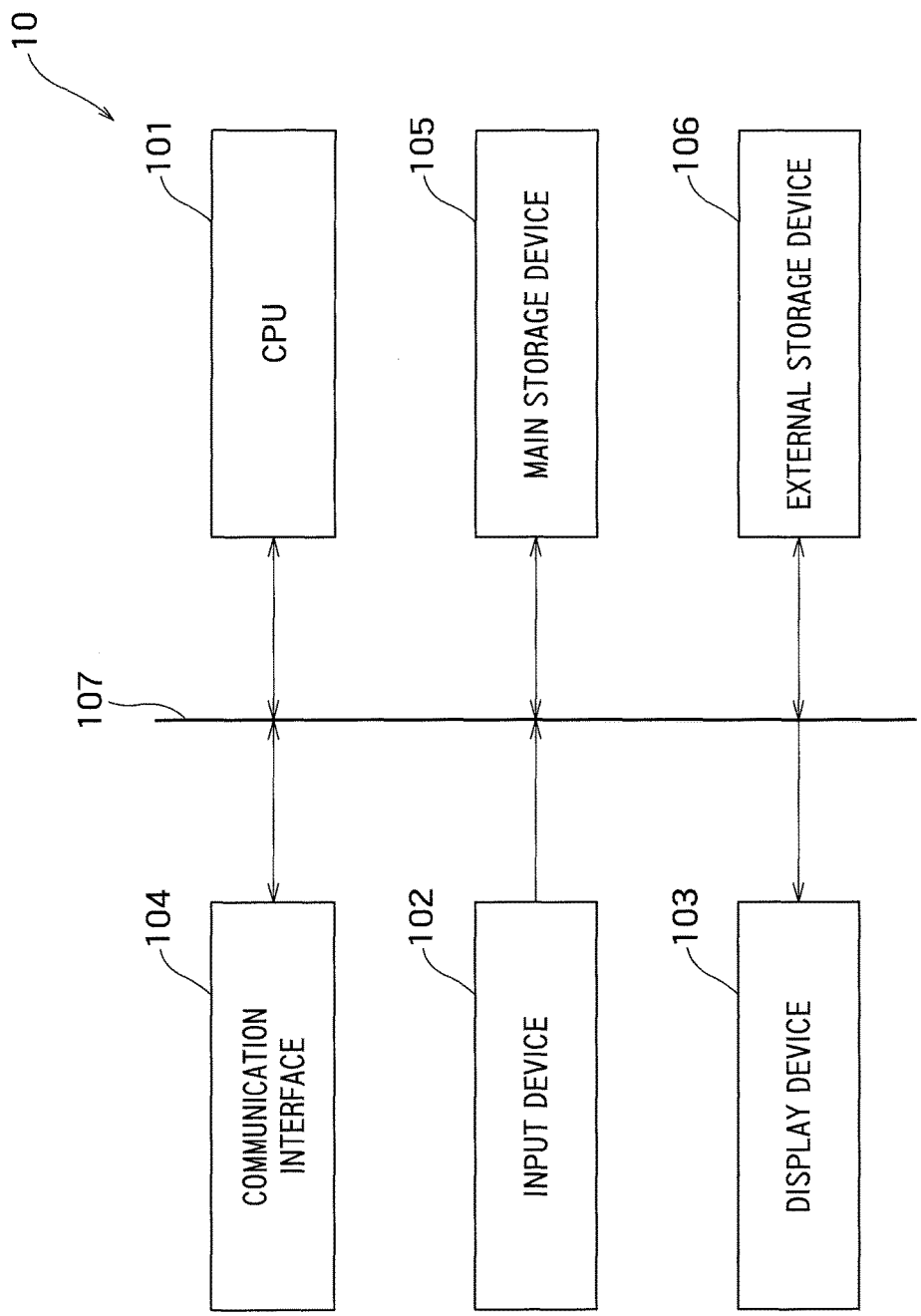
FIG. 4 is a block diagram illustrating a hardware configuration of a communication device according to the first embodiment.

Here, FIG. 4 is a block diagram illustrating the hardware configuration of the communication device 10 according to the present embodiment. As illustrated in FIG. 4, the communication device 10 includes a CPU 101, an input device 102, a display device 103, a communication interface 104, a main storage device 105, and an external storage device 106, and these are connected to each other by a bus 107.

The CPU (Central Processing Unit) 101 executes a communication program on the main storage device 105. The communication program is a program that realizes each functional component of the communication device 10. When the CPU 101 executes the communication program, each functional component described above is realized.

The input device 102 is a device for inputting data and instructions to the communication device 10 from the outside. The input device 102 may be a device, such as, for example, a keyboard, a mouse, and a touch panel, from which a user directly inputs data and instructions. Alternatively, the input device 102 may be a device such as a USB, which enables input from an external device, or may be software.

The display device 103 is a display that displays a video signal outputted from the communication device 10. The display device 103 is, for example, an LCD (liquid crystal display), a CRT (cathode ray tube), and a PDP (plasma display panel). However, it is not limited to these. The communication data held by the holder 1, the path information stored in the storage 2, and the like can be displayed by the display device 103.

The communication interface 104 is a device for the communication device 10 to communicate with another communication device included in the multi-hop network. The communication device 10 performs wireless communication or wired communication with another communication device by a predetermined communication method through the communication interface 104. The communication device 10 may include, for example, a plurality of communication interfaces whose standards and frequency bands are the same or different from each other. Further, the communication device 10 may include both of a wireless interface and a wired communication interface.

When the communication program is executed, the main storage device 105 stores the communication program, data required to execute the communication program, data generated by the execution of the communication program, and the like. The communication program is loaded on the main storage device 105 and executed. The main storage device 105 is, for example, a RAM, a DRAM, or an SRAM. However, it is not limited to these. The holder 1 and the storage 2 are constructed on at least either one of the main storage device 105 and the external storage device 106. Further, the main storage device 105 may store OS, BIOS, and various pieces of middleware of the computer.

The external storage device 106 stores the communication program, data required to execute the communication program, data generated by the execution of the communication program, and the like. When the communication program is executed, these programs and data are read to the main storage device 105. The external storage device 106 is, for example, a hard disk, an optical disk, a flash memory, and a magnetic tape. However, it is not limited to these.

The communication program may be installed in the computer in advance or may be stored in a storage medium such as a CD-ROM. Further, the communication program may be uploaded to the Internet. The communication device 10 may have a configuration that does not include the input device 102 and the display device 103.

Figure 5:
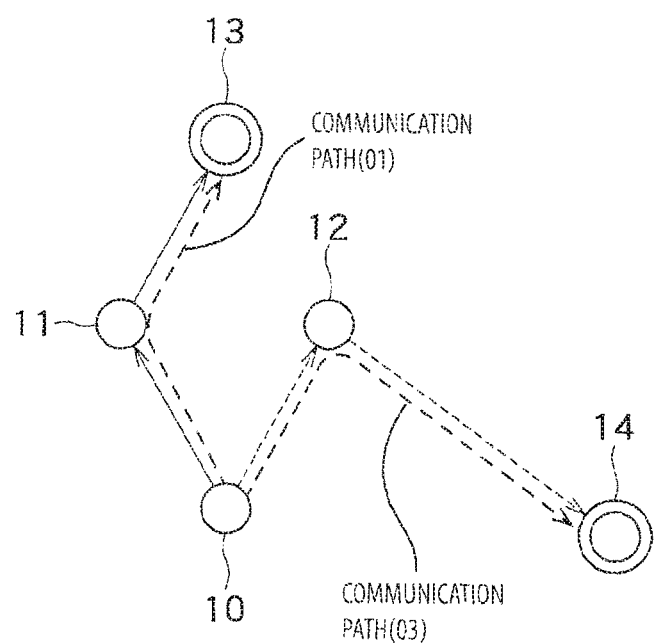
FIG. 5 is a diagram illustrating an example of a multi-hop network.
Figure 6:
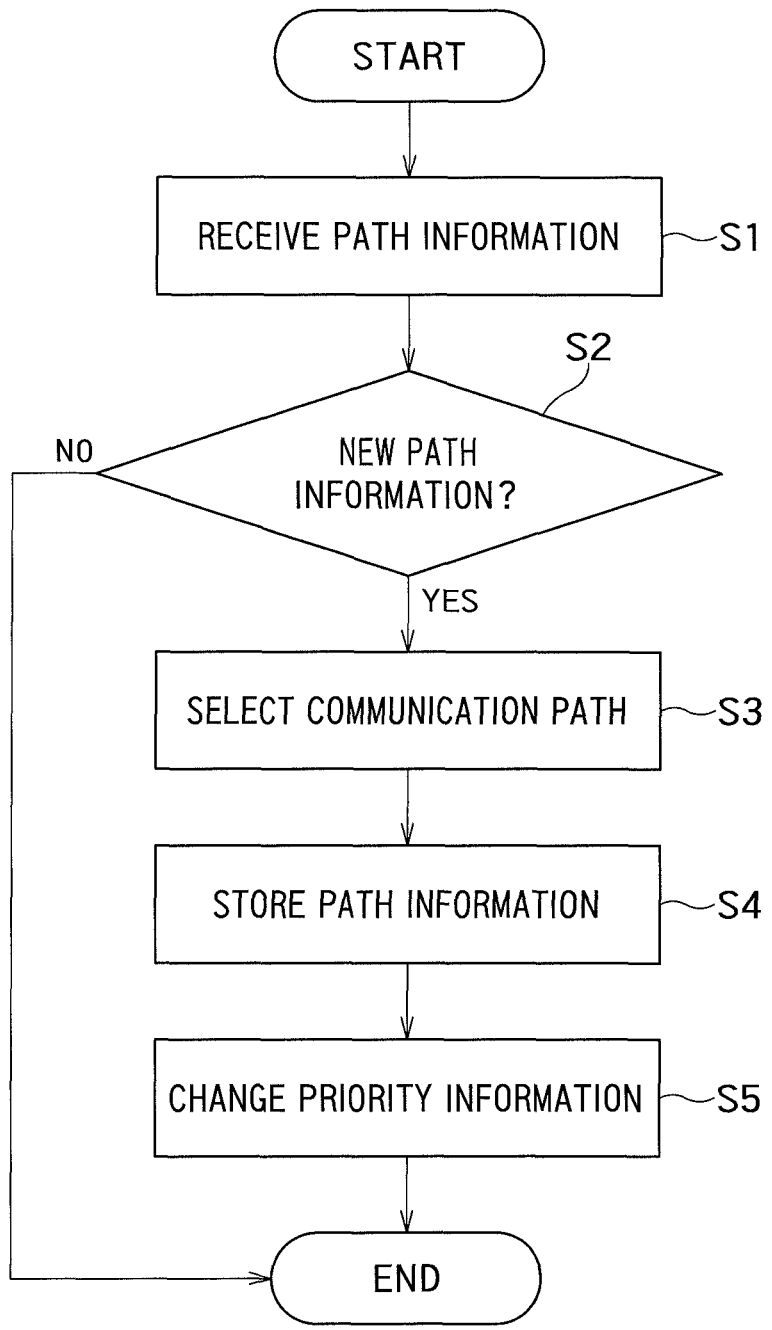
FIG. 6 is a flowchart illustrating an operation of the communication device according to the first embodiment.

Next, an operation of the communication device 10 according to the present embodiment will be described with reference to FIGS. 5 and 6. Here, FIG. 5 is a diagram illustrating an example of the multi-hop network including the communication device 10. FIG. 6 is a flowchart illustrating the operation of the communication device 10 according to the present embodiment.

The multi-hop network of FIG. 5 includes five communication devices 10 to 14. In FIG. 5, the communication devices 13 and 14 are servers (root nodes) that collect communication data. When the operation is started, the storage 2 of the communication device 10 stores the path information illustrated in FIG. 3. The flowchart of FIG. 6 illustrates an operation according to a policy where the priority for newly received path information is set to high.

In step S1, the switcher 3 receives the path information from another communication device through the communication interface 104. The other communication device may be the communication device 11 which is the next hop of the communication device 10 or may be the communication device 13 which is a server. The path information received by the communication device 10 need not include the priority information.

In step S2, the switcher 3 determines whether or not the received path information is new path information. The new path information is path information that is not stored in the storage 2. Specifically, the switcher 3 compares the path identifier of the received path information with the identifiers of the path information stored in the storage 2. When the path identifier of the received path information is not coincident with the identifiers of the path information stored in the storage 2, the switcher 3 determines that the received path information is new path information.

When the received path information is not new path information (NO in step S2), that is, when the received path information is the path information of the communication path 01 or the communication path 02, the process ends. Thereafter, the controller 4 transmits the communication data by using the communication path 01.

On the other hand, when the received path information is new path information (YES in step S2), the process proceeds to step S3. Here, it is assumed that the new path information received by the switcher 3 is the path information of the communication path 03. The communication path 03 is the communication path illustrated by dashed lines in FIG. 5. The root node of the communication path 03 is the communication device 14 and the next hop is the communication device 12.

In step S3, the switcher 3 selects the communication path 03 having the new path information as a communication path used to transmit the communication data.

In step S4, the storage 2 stores the path information of the communication path 03 selected by the switcher 3. When the path information of the communication path 03 does not include the priority information, the priority information is a null value.

In step S5, the switcher 3 changes the priority of the communication path 03 to 1. Further, the switcher 3 changes the priority of the communication paths 01 and 02 to 0. Thereby, the communication path to be used is switched to the communication path 03.

Thereafter, the controller 4 transmits the communication data by using the communication path 03. In other words, the controller 4 transmits the communication data to the communication device 12 which is the next hop in the communication path 03. The controller 4 may transmit the received path information to another communication device after the communication path is switched.

As described above, according to the present embodiment, the communication device 10 can switch the communication path to be used on the basis of the path information received from another communication device. Therefore, when the root node is switched, it is possible to switch the communication path used by the communication device 10 by inputting the path information for the switched new root node into the communication device 10. Therefore, even when a failure occurs during transmission of the communication data from the communication device 10 to the root node due to abnormality of a server and/or deterioration of connectivity between the communication devices, it is possible to collect the communication data of the communication device 10 easily by switching the root node to another communication device.

Specifically, when a failure occurs during transmission of the communication data from the communication device 10 to the server 13, a substitute server 14 is connected to the multi-hop network. Then, the path information of the communication path 03 is inputted from the substitute server 14 to the communication device 10 directly or through the other communication device 12. Thereby, the communication device 10 automatically switches the communication path to be used to the communication path 03 and transmits the communication data to the substitute server 14. Therefore, the communication data of the communication device 10 can be collected by the substitute server 14.

In the present embodiment, when the path information includes the priority information indicating multiple-valued priority, the switcher 3 may select a communication path having high priority from among the communication paths having new path information as the communication path used to transmit the communication data. Here, the communication path having high priority is, for example, a communication path having priority higher than a predetermined value, a communication path having priority higher than that of the communication path whose path information is stored in the storage 2, or a communication path having priority higher than that of the communication path that is currently being used.

Second Embodiment

Figure 7:
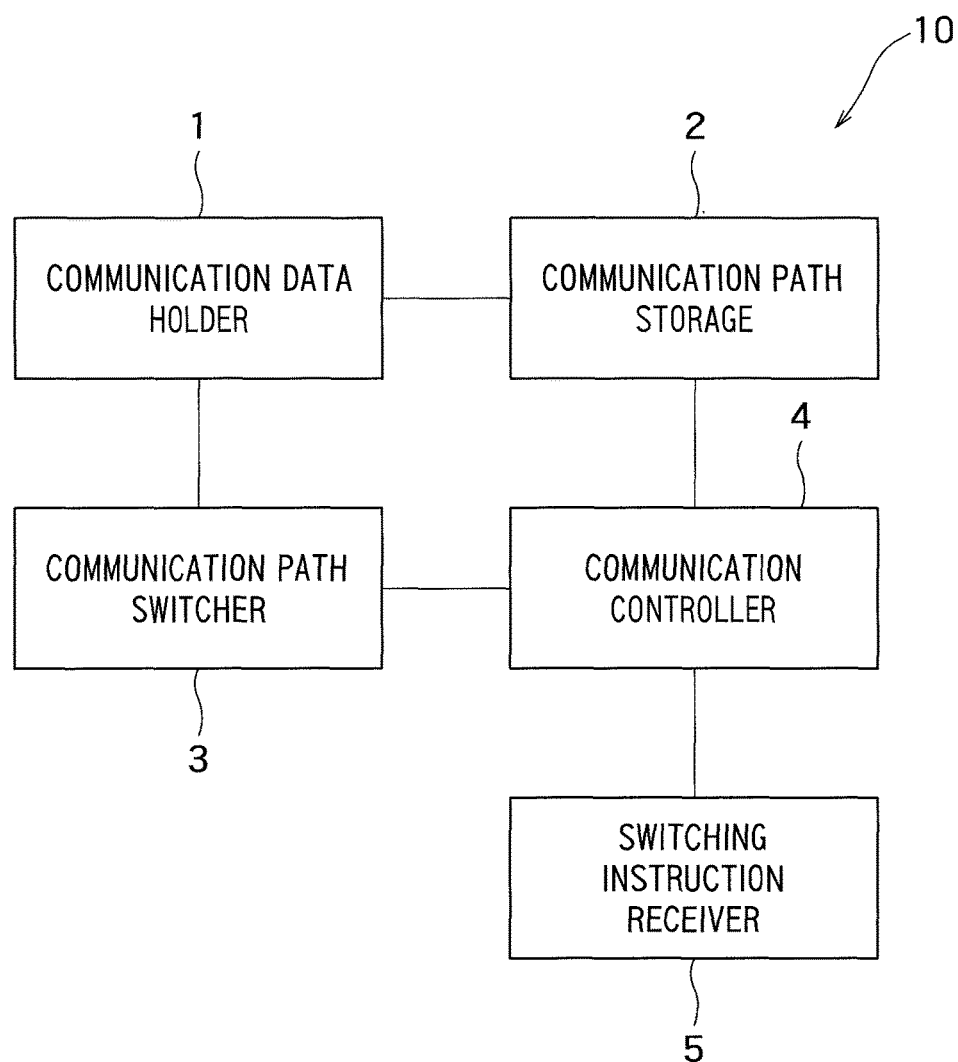
FIG. 7 is a block diagram illustrating a functional configuration of a communication device according to a second embodiment.
Figure 8:
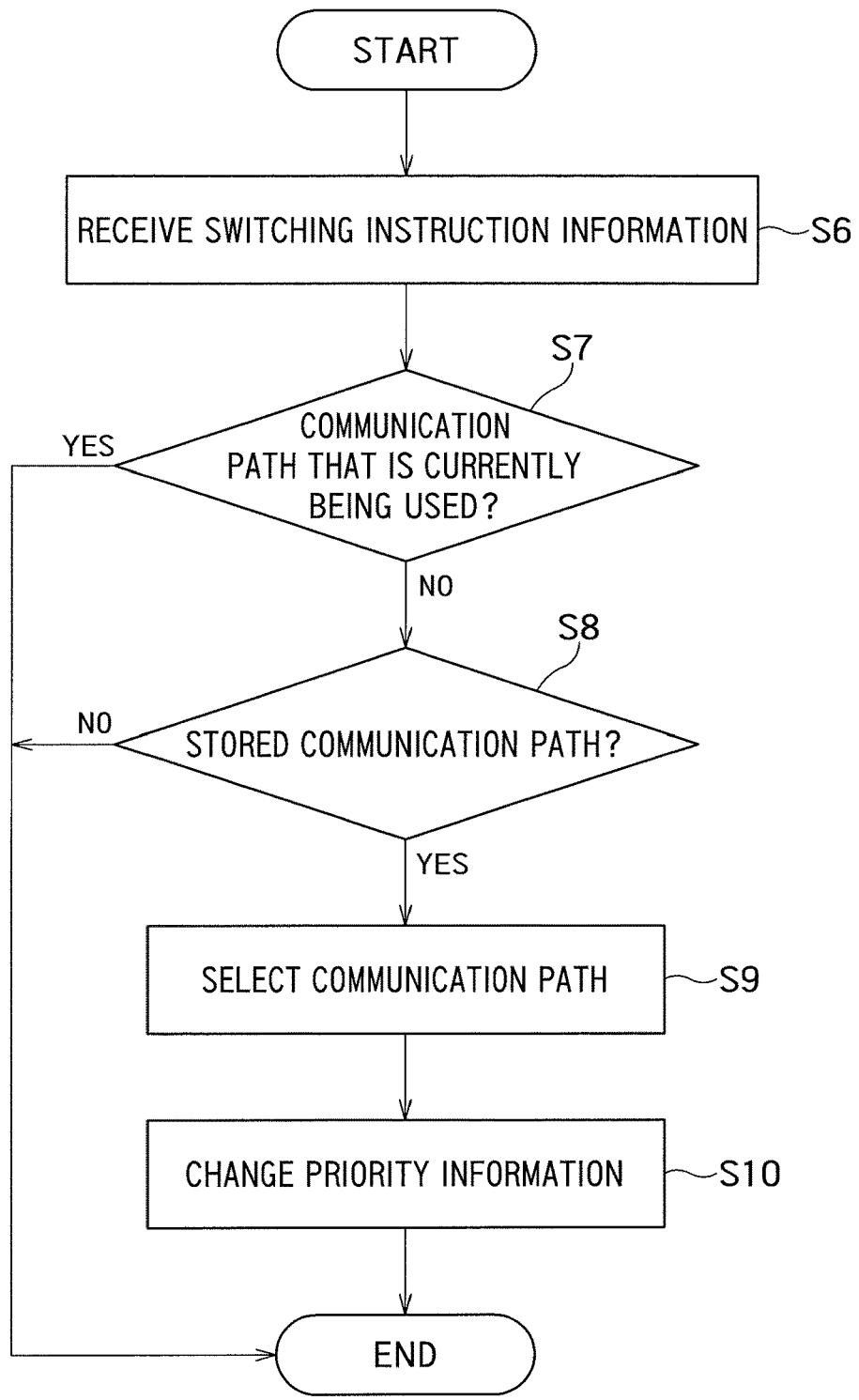
FIG. 8 is a flowchart illustrating an operation of the communication device according to the second embodiment.

A communication device 10 according to a second embodiment will be described with reference to FIGS. 7 and 8. The communication device 10 according to the present embodiment switches the communication path according to switching instruction information.

First, a functional configuration of the communication device 10 according to the second embodiment will be described with reference to FIG. 7. FIG. 7 is a block diagram illustrating the functional configuration of the communication device 10 according to the present embodiment. As illustrated in FIG. 7, the communication device 10 includes a switching instruction information receiver 5. The other components are the same as those in the first embodiment.

The switching instruction information receiver 5 (hereinafter referred to as "receiver 5") receives switching instruction information. The switching instruction information is information that instructs to switch the communication path that is currently being used to a predetermined communication path. Hereinafter, the communication path where the switching instruction information is instructed is referred to as a switching instruction path. The switching instruction information includes a path identifier that identifies the switching instruction path. As the switching instruction information, for example, information where some of the path information is modified so as to satisfy a predetermined condition can be used. Specifically, DODAG information where a rank value in RPL is set to a predetermined value can be used as the switching instruction information. The DODAG information will be described later. As the switching instruction information, path information having a predetermined format can also be used. However, the switching instruction information is not limited to this.

The hardware configuration of the communication device 10 according to the present embodiment is the same as that of the first embodiment. When a computer executes the communication program, the functional configuration of the receiver 5 is realized.

Next, an operation of the communication device 10 according to the present embodiment will be described with reference to FIG. 8. FIG. 8 is a flowchart illustrating the operation of the communication device 10 according to the present embodiment. In the description below, it is assumed that the communication device 10 is included in the multi-hop network of FIG. 5, and when the operation is started, the communication device 10 stores the path information of the communication paths 01 and 03 and uses the communication path 01.

In step S6, the receiver 5 receives the switching instruction information from information which the communication device 10 receives from another communication device through the communication interface 104. The other communication device may be the communication device 11 which is the next hop of the communication device 10 or may be the communication device 13 which is a server.

In step S7, the switcher 3 determines whether or not the switching instruction path of the switching instruction information received by the receiver 5 is the communication path that is currently being used. The switcher 3 compares the path identifier of the switching instruction path with the path identifier that identifies the communication path that is currently being used, and when the both identifiers are coincident with each other, the switcher 3 determines that the switching instruction path is the communication path that is currently being used.

When the switching instruction path is the communication path that is currently being used (YES in step S7), that is, when the switching instruction path is the communication path 01, the process ends. Thereafter, the controller 4 transmits the communication data by using the communication path 01.

On the other hand, when the switching instruction path is not the communication path that is currently being used (NO in step S7), that is, when the switching instruction path is the communication path 02 or 03, the process proceeds to step S8.

In step S8, the switcher 3 determines whether or not the switching instruction path is the communication path whose path information is stored in the storage 2. The switcher 3 compares the path identifier of the switching instruction path with the path identifier of the path information stored in the storage 2, and when the both identifiers are coincident with each other, the switcher 3 determines that the path information of the switching instruction path is stored in the storage 2.

When the path information of the switching instruction path is not stored in the storage 2 (NO in step S8), that is, the switching instruction path is the communication path 02, the process ends. Thereafter, the controller 4 transmits the communication data by using the communication path 01.

On the other hand, when the path information of the switching instruction path is stored in the storage 2 (YES in step S8), that is, the switching instruction path is the communication path 03, the process proceeds to step S9.

In step S9, the switcher 3 selects the switching instruction path 03 as a communication path used to transmit the communication data.

In step S10, the switcher 3 changes the priority of the switching instruction path 03 to 1. Further, the switcher 3 changes the priority of the communication path 01 to 0. Thereby, the communication path to be used is switched to the communication path 03.

Thereafter, the controller 4 transmits the communication data by using the communication path 03. In other words, the controller 4 transmits the communication data to the communication device 12 which is the next hop in the communication path 03. The controller 4 may transmit the switching instruction information to another communication device after the communication path is switched.

As described above, according to the present embodiment, the communication device 10 can switch the communication path to be used on the basis of the switching instruction information received from another communication device. The path information of the communication path to be switched is stored in the storage 2 in advance, so that the time to store the path information of the communication path in the storage 2 is unnecessary. Therefore, it is possible to switch the communication path in a short time.

Third Embodiment

Figure 9:
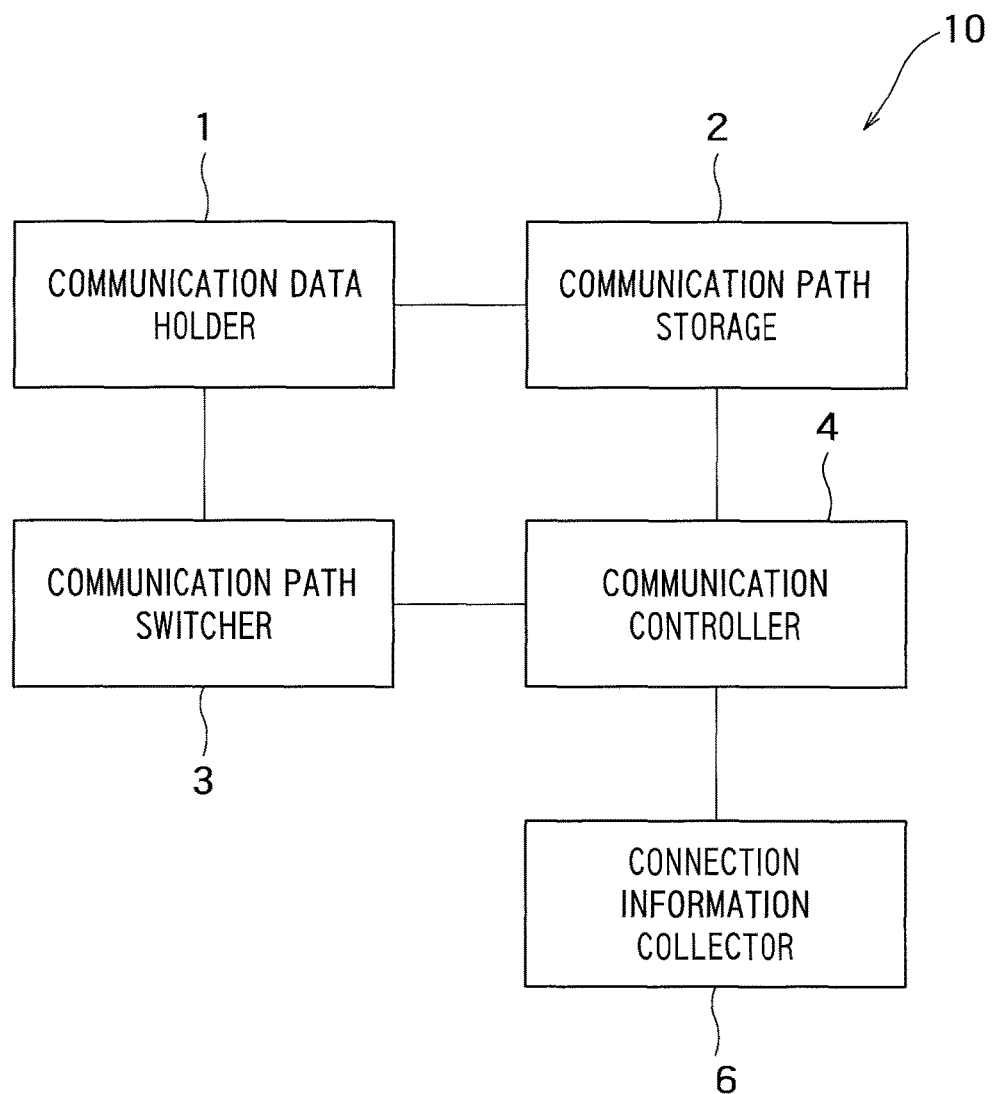
FIG. 9 is a block diagram illustrating a functional configuration of a communication device according to a third embodiment.
Figure 10:
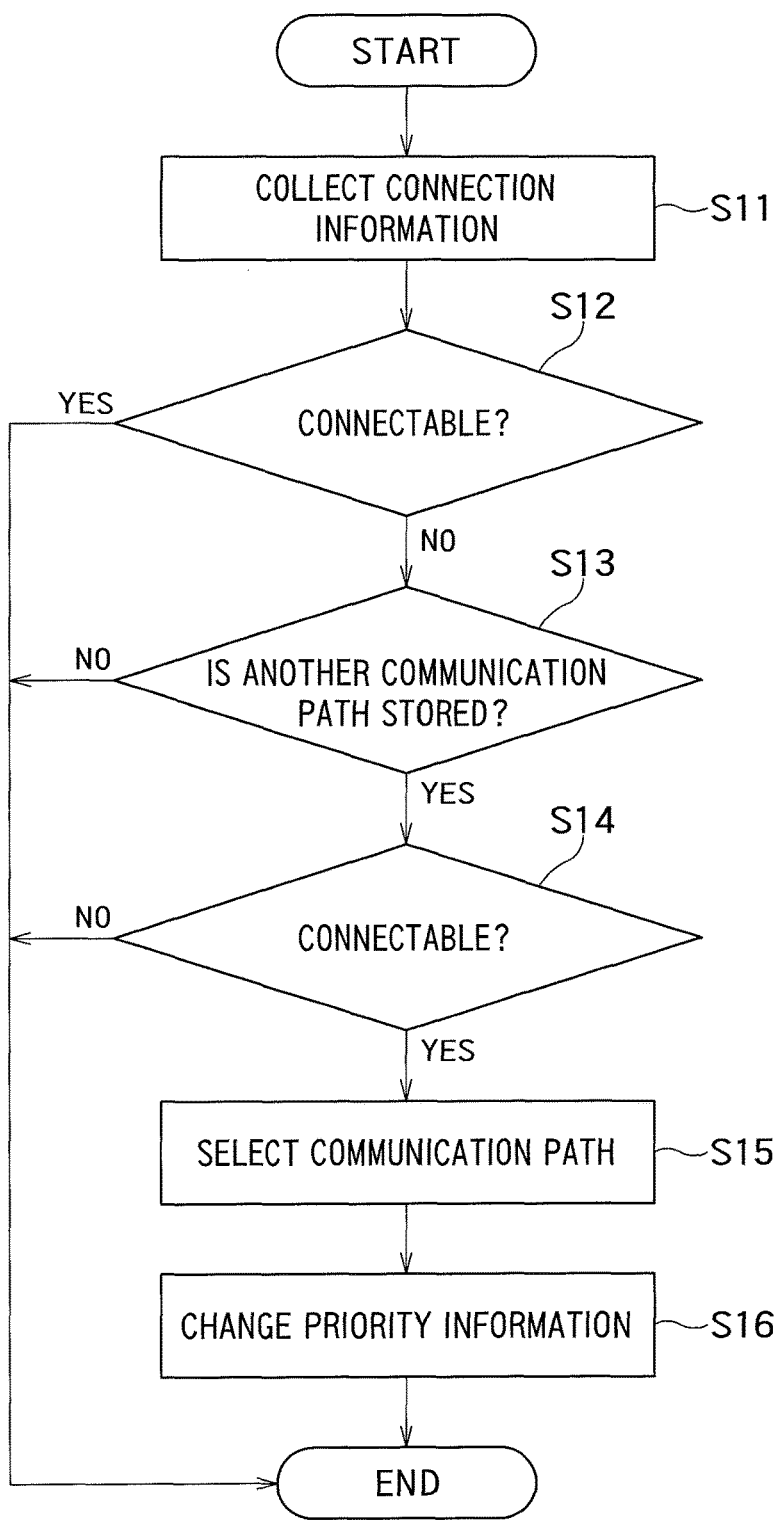
FIG. 10 is a flowchart illustrating an operation of the communication device according to the third embodiment.

A communication device 10 according to a third embodiment will be described with reference to FIGS. 9 and 10. The communication device 10 according to the present embodiment switches the communication path according to the connectivity of communication path.

First, a functional configuration of the communication device 10 according to the third embodiment will be described with reference to FIG. 9. FIG. 9 is a block diagram illustrating the functional configuration of the communication device 10 according to the present embodiment. As illustrated in FIG. 9, the communication device 10 includes a connection information collector 6. The other components are the same as those in the first embodiment.

The connection information collector 6 (hereinafter referred to as "collector 6") collects connection information. The connection information is information indicating the connectivity of communication path. The connection information may be information indicating the presence or absence of the connectivity or may be information indicating the strength of the connectivity. As the connection information, for example, the number of times when transmission of the communication data fails and error notification of ICMP can be used. However, the connection information is not limited to these.

The hardware configuration of the communication device 10 according to the present embodiment is the same as that of the first embodiment. When a computer executes the communication program, the functional configuration of the collector 6 is realized.

Next, an operation of the communication device 10 according to the present embodiment will be described with reference to FIG. 10. FIG. 10 is a flowchart illustrating the operation of the communication device 10 according to the present embodiment. In the description below, it is assumed that the communication device 10 is included in the multi-hop network of FIG. 5, and when the operation is started, the communication device 10 stores the path information of the communication paths 01, 02, and 03 and uses the communication path 01. Further, it is assumed that the communication paths 01 and 02 are not connectable and the communication path 03 is connectable.

In step S11, the collector 6 collects the connection information indicating the connectivity of the communication path 01 that is currently being used. The collector 6 may collect the connection information from another communication device or may generate the connection information from history information of transmission results of the communication data or the like. The other communication device may be the communication device 11 which is the next hop of the communication device 10 or may be the communication device 13 which is a server.

In step S12, the switcher 3 determines whether or not the communication path 01 that is currently being used is connectable based on the connection information collected by the collector 6. In other words, the switcher 3 determines whether or not the communication data can be transmitted to the communication device 13 which is a server by using the communication path 01 that is currently being used.

For example, the switcher 3 performs the determination by comparing the connectivity indicated by the connection information with a predetermined threshold value. For example, when the connection information is the number of times when transmission of the communication data fails in a predetermined period of time, the switcher 3 compares the number of times when the transmission fails with a predetermined threshold value, and when the number of times when the transmission fails is greater than or equal to the threshold value, the switcher 3 determines that the communication path 01 is not connectable. Alternatively, the switcher 3 may determine whether or not the communication path 01 is connectable based on the presence or absence of error notification of ICMP.

When the communication path 01 that is currently being used is connectable (YES in step S12), the process ends. Thereafter, the controller 4 transmits the communication data by using the communication path 01.

On the other hand, when the communication path 01 that is currently being used is not connectable (NO in step S12), the process proceeds to step S13.

In step S13, the switcher 3 determines whether or not the path information of a communication path (another communication path) other than the communication path that is currently being used is stored in the storage 2.

When the path information of another communication path is not stored in the storage 2 (NO in step S13), the process ends. Thereafter, the communication device 10 is disconnected from the multi-hop network. Alternatively, the communication device 10 may perform communication using a new communication path by the method described in the first embodiment.

On the other hand, when the path information of another communication path is stored in the storage 2 (YES in step S13), the process proceeds to step S14.

In step S14, the switcher 3 determines whether or not another communication path whose path information is stored in the storage 2 is connectable on the basis of the connection information collected by the collector 6. The determination can be performed by the same method as that in step S12. The path information of another communication path may be collected in step S11 or in step S14.

When all of other communication paths stored in the storage 2 are not connectable (NO in step S14), the process ends. Thereafter, the communication device 10 is disconnected from the multi-hop network. Alternatively, the communication device 10 may perform communication using a new communication path by the method described in the first embodiment.

On the other hand, when at least one of the other communication paths stored in the storage 2 is connectable (YES in step S14), the process proceeds to step S15.

In step S15, the switcher 3 selects the communication path 03 that is determined to be connectable as a communication path used to transmit the communication data. When there is a plurality of other communication paths that are connectable, for example, the switcher 3 selects a communication path having the best connectivity based on the connection information or a communication path where the number of hops to a server (root node) is the smallest.

In step S16, the switcher 3 changes the priority of the selected communication path 03 to 1. Further, the switcher 3 changes the priority of the communication paths 01 and 02 to 0. Thereby, the communication path to be used is switched to the communication path 03.

Thereafter, the controller 4 transmits the communication data by using the communication path 03. In other words, the controller 4 transmits the communication data to the communication device 12 which is the next hop in the communication path 03.

As described above, according to the present embodiment, when the communication path that is currently being used has no connectivity or low connectivity, the communication device 10 can automatically select another connectable communication path and communicate with a server (root node).

Fourth Embodiment

A communication device 10 according to a fourth embodiment will be described with reference to FIGS. 11 to 15. The communication device 10 according to the present embodiment is included in a multi-hop network that employs RPL (IPv6 Routing Protocol for Low-Power and Lossy Networks) as a communication protocol.

First, a method for setting a communication path of the communication device 10 when the communication device 10 joins a multi-hop network including the communication devices 11 to 13 in FIG. 2 will be described with reference to FIG. 11. In the description below, it is assumed that the communication devices 11 and 12 are adjacent nodes of the communication device 10, and the communication device 13 is a root node (server).

The communication device 10 transmits DIS (DODAG Information Solicitation) to the adjacent nodes (communication devices) 11 and 12 by multicast. The DIS is a message requesting a node that receives the DIS to transmit DIO (DODAG Information Object). The adjacent nodes 11 and 12 that receive the DIS transmit the DIO to the communication device 10.

The DIO is a message notifying DODAG information related to DODAG (Destination Oriented Directed Acyclic Graph) that is a topology of a multi-hop network. Here, FIG. 12 is a diagram illustrating an example of a format of the DIO. As illustrated in FIG. 12, the DIO notifies RPL Instance ID, Version number, Rank, G, MOP, Pfr, DTSN, Flags, and DODAGID as the DODAG information.

The RPL Instance ID is an identifier given to each instance of RPL. The data length of the RPL Instance ID is one byte. When the most significant bit of the RPL Instance ID is 0, the RPL Instance ID indicates a global instance, and when the most significant bit is 1, the RPL Instance ID indicates a local instance. The RPL Instance ID can be used as a path identifier.

The Version number is a version of each communication path. The data length of the Version number is one byte. The Version number can be used as a path identifier.

The Rank (rank value) is the number of hops to the root node. It means that the smaller the rank value, the closer to the root node. The rank value of the root node is 0. In the RPL, the communication path is set based on the rank value. The data length of the Rank is two bytes.

The G indicates the connectivity with the root node. The data length of the G is one bit. The G can be used as the connection information in the third embodiment.

The DODAGID is an IPv6 address of the root node. The data length of the DODAGID is 16 bytes. The DODAGID can be used as a path identifier.

The communication device 10 that receives the DIOs as described above from the adjacent nodes 11 and 12 sets communication path 01 to the root node (communication device) 13 based on the rank values of the adjacent nodes 11 and 12 and the like included in the DIOs. After the communication device 10 sets the communication path 01, the communication device 10 transmits DAO (Destination Advertisement Object) to the root node 13 of the set communication path 01. The DAO is a message that notifies the next hop (parent node) of the communication device 10. The root node 13 can receive the next hop of the communication device 10 by receiving the DAO.

The root node 13 that receives the DAO transmits DAO_ACK to the communication device 10. The DAO_ACK is a message that notifies receiving the DAO. When the communication device 10 receives the DAO_ACK, the setting of the communication path 01 is completed. Thereafter, the communication device 10 can transmit the communication data by using the communication path 01.

When setting the communication path 01, the communication device 10 stores the DODAG information notified by the DIOs received from the adjacent nodes 11 and 12 in the storage 2 as the path information.

Figure 13:
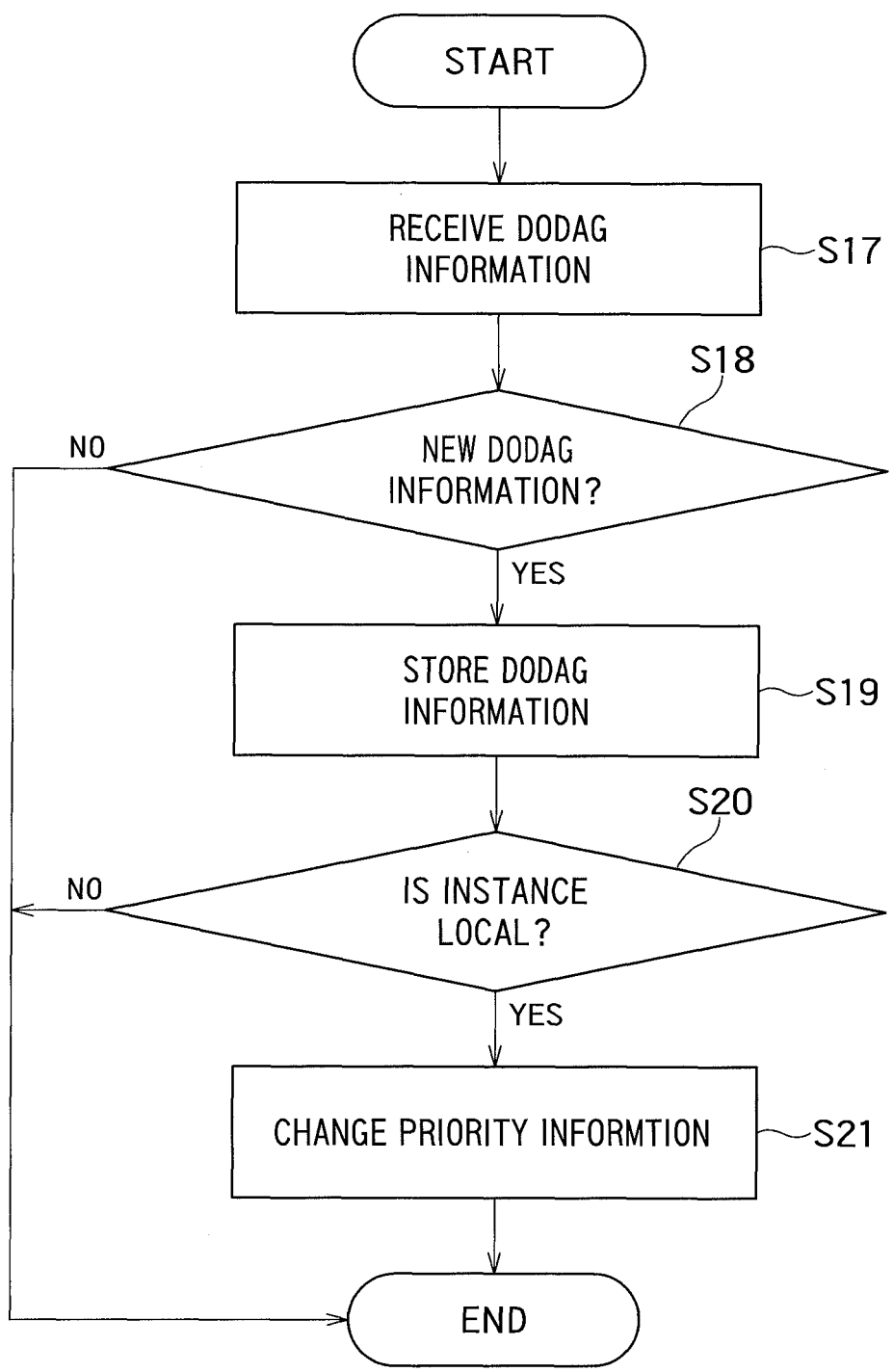
FIG. 13 is a flowchart illustrating an operation of the communication device according to the fourth embodiment.

Next, an operation of the communication device 10 according to the present embodiment will be described with reference to FIGS. 13 to 15. FIG. 13 is a flowchart illustrating the operation of the communication device 10 according to the present embodiment. In the description below, it is assumed that a communication path to a server A (root node) is set for the communication device 10, and the communication device 10 stores DODAG information (DODAG1) used when the communication path is set. In the present embodiment, the path information includes two-level priority and the most significant bit of the RPL Instance ID indicates the priority of the path information.

FIG. 14 is a diagram illustrating an example of the DODAG1 (path information) stored in the storage 2 of the communication device 10. As illustrated in FIG. 14, the DODAG1 includes RPL Instance ID, DODAGID, version number, rank value of the communication device 10, and address and rank value of adjacent nodes. The communication device whose rank value is 0 is the server A. According to FIG. 14, the address of the server A is 2001::1. The DODAGID is the address of the server A.

When the communication device 10 receives DIO from another communication device, the communication device 10 starts the switching operation of communication path illustrated in FIG. 13.

In step S17, the receiver 5 receives the DODAG information (DODAG2) notified by the received DIO.

In step S18, the switcher 3 determines whether or not the DODAG2 is new path information by comparing the path identifier included in the DODAG1 stored in the storage 2 with the path identifier included in the received DODAG information.

Here, FIG. 15 is a diagram illustrating an example of the DODAG information (DODAG2) of the communication path where a server B is the root node. When the communication device 10 receives the DODAG2, the switcher 3 can perform the determination by using at least one of the RPL Instance ID, the DODAGID, the version number, and the node address (address of the server A or B) of the DODAG1 and the DODAG2 as the path identifier. For example, when the path identifier is the DODAGID, the DODAGID of the DODAG1 is 2001::1 and the DODAGID of the DODAG2 is 2002::2, so that the switcher 3 determines that the DODAG2 is new path information.

When the received DODAG2 is not new path information (NO in step S18), the process ends. Thereafter, the controller 4 transmits the communication data by using the communication path set by the DODAG1. Therefore, the communication data of the communication device 10 is transmitted to the server A.

On the other hand, when the received DODAG2 is new path information (YES in step S18), the process proceeds to step S19.

In step S19, the storage 2 stores the received DODAG2.

In step S20, the switcher 3 determines whether or not the instance of the DODAG2 is local. In other words, the switcher 3 determines whether or not the most significant bit of the RPL Instance ID of the DODAG2 is 1.

When the instance of the DODAG2 is global (NO in step S18), that is, when the most significant bit of the RPL Instance ID of the DODAG2 is 0, the process ends. Thereafter, the controller 4 transmits the communication data by using the communication path set by the DODAG1. Therefore, the communication data of the communication device 10 is transmitted to the server A.

On the other hand, when the instance of the DODAG2 is local (YES in step S18), that is, when the most significant bit of the RPL Instance ID of the DODAG2 is 1, the process proceeds to step S21.

In step S21, the switcher 3 changes the priority of the DODAG2 to 1. Further, the switcher 3 changes the priority of the DODAG1 to 0. Thereby, the communication path to be used is switched to the communication path set by the DODAG2.

Thereafter, the controller 4 transmits the communication data by using the communication path set by the DODAG2. Therefore, the communication data of the communication device 10 is transmitted to the server B. The controller 4 may transmit the DIO that notifies the received DODAG2 to another communication device after the communication path is switched.

As described above, according to the present embodiment, it is possible to switch the communication path by using the most significant bit of the RPL Instance ID as the switching instruction information. The switching instruction information is not limited to this, but may be, for example, the rank value, the version number, the DODAGID, and the like.

Although the DODAG information is used as the switching instruction information in the present embodiment, the DODAG information can be used as the path information and the connection information in the first and third embodiments. Thereby, it is possible to realize the communication device according to the first and third embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A communication device included in a multi-hop network, the device comprising:
a storage that stores path information including an identifier that identifies a communication path and destination information that indicates a destination of communication data on the communication path; and
processing circuitry configured to control the communication device to at least:
collect connection information indicating connectivity of the communication path, wherein the connection information includes a strength of connectivity;
switch the communication path used to transmit the communication data based on the path information stored in the storage and the collected connection information; and
transmit the communication data to the destination of the switched communication path,
wherein the processing circuitry is further configured to:
receive switching instruction information from another communication device,
determine whether a switching instruction path which is a communication path instructed by the switching instruction information is being currently used and whether, in a case that the switching instruction path is not being currently used, an identifier of the switching instruction path is stored in the storage,
switch the currently used communication path to the switching instruction path when the switching instruction path is not being currently used and when an identifier of the switching instruction path is stored in the storage, and
not switch the currently used communication path when the switching instruction path is not being currently used and when the identifier of the switching instruction path is not stored in the storage.

2. The device according to claim 1, wherein the identifier that identifies a communication path includes at least one of a server address, a border router address, and an RPL instance ID.

3. The device according to claim 1, wherein the destination information includes an address of another communication device which is a transmission destination of the communication data.

4. A multi-hop network comprising: a plurality of the devices according to claim 1.

5. A communication device included in a multi-hop network, the device comprising:
a storage that stores path information including an identifier that identifies a communication path and destination information that indicates a destination of communication data on the communication path; and
processing circuitry configured to control the communication device to at least:
collect connection information indicating connectivity of the communication path, wherein the connection information includes a strength of connectivity;
switch the communication path used to transmit the communication data based on the path information stored in the storage and the collected connection information; and transmit the communication data to the destination of the switched communication path,
wherein
the device operates in compliance with RPL (IPv6 Routing Protocol for Low-Power and Lossy Networks), and
the processing circuitry is further configured to:
receive DODAG (Destination Oriented Directed Acyclic Graph) information being switching instruction information from another communication device,
determine whether an identifier of a communication path instructed by the DODAG information is stored in the storage and whether RPL Instance ID specified by the DODAG information is a global RPL Instance ID or a local RPL Instance ID, and switch a currently used communication path to the communication path instructed by the DODAG information when an identifier of the communication path instructed by the DODAG information is not stored and the RPL Instance ID specified by the DODAG information is the local RPL Instance ID.

* * * * *